US010047723B2

(12) United States Patent
Akimoto

(10) Patent No.: US 10,047,723 B2
(45) Date of Patent: Aug. 14, 2018

(54) NATURAL ENERGY EXTRACTION APPARATUS

(75) Inventor: Hiromichi Akimoto, Tokyo (JP)

(73) Assignee: ALBATROSS TECHNOLOGY LLC, Tokyo (JP)

( * ) Notice: Subject to any disclaimer, the term of this patent is extended or adjusted under 35 U.S.C. 154(b) by 1162 days.

(21) Appl. No.: 14/118,831

(22) PCT Filed: May 29, 2012

(86) PCT No.: PCT/JP2012/063815
§ 371 (c)(1),
(2), (4) Date: Nov. 19, 2013

(87) PCT Pub. No.: WO2012/165444
PCT Pub. Date: Dec. 6, 2012

(65) Prior Publication Data
US 2014/0147248 A1 May 29, 2014

(30) Foreign Application Priority Data

Jun. 1, 2011 (JP) ................................. 2011-123225
Jul. 5, 2011 (JP) ................................. 2011-149016

(51) Int. Cl.
*F03D 9/00* (2016.01)
*F03B 17/06* (2006.01)
(Continued)

(52) U.S. Cl.
CPC ............... *F03D 9/00* (2013.01); *F03B 17/06* (2013.01); *F03B 17/063* (2013.01); *F03D 3/005* (2013.01);
(Continued)

(58) Field of Classification Search
CPC ..... F03D 9/00; F03D 9/02; F03D 7/00; F03D 11/04; F03D 3/00; F03D 7/06;
(Continued)

(56) References Cited

U.S. PATENT DOCUMENTS 4,045,148 A 8/1977 Morin
5,230,215 A 7/1993 Nagata
(Continued)

FOREIGN PATENT DOCUMENTS

EP 2 080 899 A1 7/2009
FR 2 320 430 A2 3/1977
(Continued)

OTHER PUBLICATIONS

Extended European Search Report issued in related application 12807564.5, completed Dec. 12, 2014 and dated Dec. 22, 2014.
(Continued)

*Primary Examiner* — Logan Kraft
*Assistant Examiner* — Joshua R Beebe
(74) *Attorney, Agent, or Firm* — Griffin and Szipl PC

(57) ABSTRACT

An object of the present invention is to provide a natural energy extraction apparatus comprising a vertical rotating shaft and a float for supporting the vertical rotating shaft, wherein the internal structure of the float is simpler, the float and a mooring apparatus are more compact, and production cost is lower than in the conventional natural energy extraction apparatus. A natural energy extraction apparatus comprises a first float forming a swingable vertical rotating shaft, a second float moored to surround the first float, and a power transmission device attached to the second float to convert rotational kinetic energy of the first float to driving torque for driven equipment, and the natural energy extraction apparatus is installed on a body of water.

23 Claims, 9 Drawing Sheets

(51) Int. Cl.
*F03D 7/06* (2006.01)
*F03D 3/00* (2006.01)
*F03D 13/20* (2016.01)

(52) U.S. Cl.
CPC .............. *F03D 7/06* (2013.01); *F03D 13/22* (2016.05); *F05B 2240/93* (2013.01); *F05B 2240/95* (2013.01); *Y02E 10/223* (2013.01); *Y02E 10/28* (2013.01); *Y02E 10/38* (2013.01); *Y02E 10/727* (2013.01); *Y02E 10/74* (2013.01); *Y02P 70/523* (2015.11); *Y02P 70/527* (2015.11)

(58) Field of Classification Search
CPC ........ F03D 3/005; F16C 19/507; F03B 17/06; F03B 17/063; Y02E 10/223; Y02E 10/38; Y02E 10/727; Y02E 10/28; Y02E 10/74; Y02P 70/527; Y02P 70/523; F05B 2240/93; F05B 2240/95
See application file for complete search history.

(56) References Cited

U.S. PATENT DOCUMENTS

| | | | | |
|---|---|---|---|---|
| 5,494,353 | A * | 2/1996 | Diemer | F16C 19/507 384/10 |
| 5,860,382 | A * | 1/1999 | Hobdy | B63B 21/507 114/230.15 |
| 6,535,135 | B1 * | 3/2003 | French | B61K 9/04 340/682 |
| 6,749,399 | B2 | 6/2004 | Heronemus | |
| 7,397,144 | B1 | 7/2008 | Brostmeyer | |
| 7,839,009 | B2 | 11/2010 | Rink | |
| 8,497,593 | B2 | 7/2013 | Klukowski | |
| 2002/0006334 | A1 * | 1/2002 | Szpur | F03D 3/065 416/197 A |
| 2003/0170123 | A1 | 9/2003 | Heronemus | |
| 2004/0042895 | A1 | 3/2004 | Seki | |
| 2005/0058536 | A1 * | 3/2005 | Podratzky | B64C 27/021 415/123 |
| 2008/0012345 | A1 * | 1/2008 | Parker | F03B 17/061 290/54 |
| 2008/0018115 | A1 * | 1/2008 | Orlov | F03B 17/061 290/54 |
| 2008/0213083 | A1 * | 9/2008 | Unno | F03D 3/067 415/4.2 |
| 2009/0236858 | A1 | 9/2009 | Johnson | |
| 2011/0081243 | A1 * | 4/2011 | Sullivan | F03D 3/002 416/120 |
| 2011/0217167 | A1 * | 9/2011 | Hancock | F03D 1/0675 416/23 |
| 2011/0255975 | A1 * | 10/2011 | Perless | F03D 3/061 416/176 |
| 2014/0147248 | A1 | 5/2014 | Akimoto | |

FOREIGN PATENT DOCUMENTS

| | | | |
|---|---|---|---|
| JP | 58-072677 | A | 4/1983 |
| JP | 60-124587 | U | 8/1985 |
| JP | 62-284967 | A | 12/1987 |
| JP | 05-296136 | A | 11/1993 |
| JP | 11-201018 | A | 7/1999 |
| JP | 2003-206848 | A | 7/2003 |
| JP | 2004-068777 | A | 3/2004 |
| JP | 2005-519235 | A | 6/2005 |
| JP | 2007-040217 | A | 2/2007 |
| JP | 2008-063961 | A | 3/2008 |
| WO | 03/076801 | A2 | 9/2003 |
| WO | 03/089787 | A1 | 10/2003 |
| WO | 2008/085056 | A1 | 7/2008 |
| WO | WO 2010107330 A2 * | | 9/2010 .......... H02K 7/1853 |
| WO | 2012/058284 | A1 | 5/2012 |

OTHER PUBLICATIONS

Korean Office Action issued in related application 10-2013-7029870 dated Oct. 15, 2014, including a Japanese translation thereof.
Extended European Search Report issued in corresponding application 12793316.6, completed Oct. 28, 2014 and dated Nov. 3, 2014.
Communication issued in corresponding Korean application 9-5-2015-004767062 and Japanese translation thereof (no English translation available), dated Jan. 21, 2015.
Notice of Allowance issued in co-pending related U.S. Appl. No. 14/118,850 dated Nov. 5, 2015.
International Search Report issued in corresponding application No. PCT/JP2012/063815, completed Jul. 31, 2012 and dated Aug. 7, 2012.
Written Opinion of the International Searching Authority issued in corresponding application No. PCT/JP2012/063815 PCT/JP2012/063815, completed Jul. 31, 2012 and dated Aug. 7, 2012.
International Search Report issued in related application No. PCT/JP2012/066848, completed Sep. 18, 2012 and dated Oct. 2, 2012.
Written Opinion of the International Searching Authority issued in related application No. PCT/JP2012/066848, completed Sep. 18, 2012 and dated Oct. 2, 2012.
Microfilm of the specification and drawings annexed to the request of Japanese Utility Model Application No. 011018/1984 (Laid open No. 124587/1985) (Meidensha Corp.), Aug. 22, 1985 (see Foreign Reference 11, above).

\* cited by examiner

Fig.2
(a)
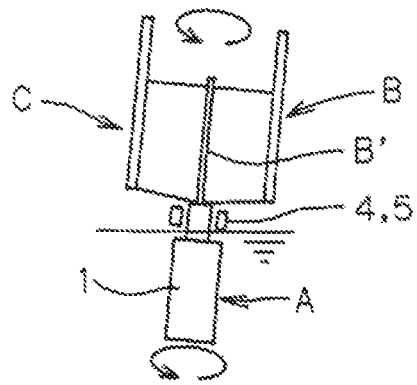
(b)
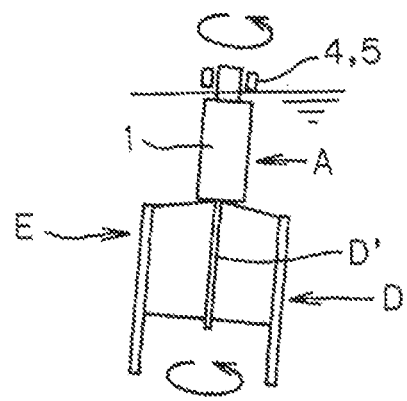
(c)
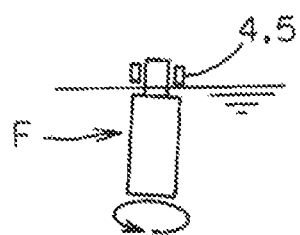

Fig.4
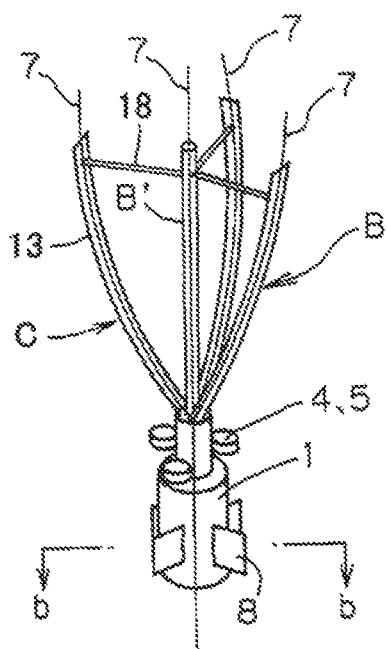
(a)
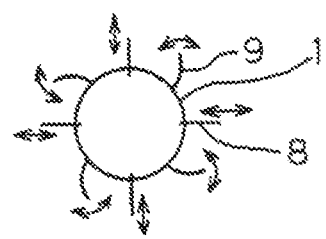
(b)

NATURAL ENERGY EXTRACTION APPARATUS

This is a National Phase Application in the United States of International Patent Application No. PCT/JP2012/063815 filed May 29, 2012, which claims priority on Japanese Patent Application Nos. 2011-123225, filed Jun. 1, 2011 and 2011-149016, filed Jul. 5, 2011. The entire disclosures of the above patent applications are hereby incorporated by reference.

TECHNICAL FIELD

The present invention relates to a natural energy extraction apparatus

BACKGROUND ART

Patent document No. 1 discloses an offshore wind energy extraction apparatus comprising a vertical rotating shaft, a float for supporting the vertical rotating shaft, and a power generator installed in the float to operably engage the vertical rotating shaft and be rotated by the vertical rotating shaft, wherein the float is moored on a body of water.

PRIOR ART DOCUMENT

Patent Document

Patent Document No. 1: WO03/089787

DISCLOSURE OF INVENTION

Problem to be Solved

The offshore wind energy extraction apparatus of Patent Document No. 1 has problems, including, inter alia, that installation of supporting members for rotatably supporting the vertical rotating shaft and the power generator in the float makes the internal structure of the float complicated and increases production cost and that an attempt to make the vertical rotating shaft stand vertically as desired increases the sizes of the float and a mooring apparatus, etc.

Therefore, an object of the present invention is to provide a natural energy extraction apparatus comprising a vertical rotating shaft and a float for supporting the vertical rotating shaft, wherein the internal structure of the float is simpler, the float and the mooring apparatus are more compact, and production cost is lower than in the conventional natural energy extraction apparatus.

Means for Achieving the Object

In accordance with the present invention, there is provided a natural energy extraction apparatus comprising a first float forming a swingable vertical rotating shaft, a second float moored to surround the first float, and a power transmission device attached to the second float to convert rotational kinetic energy of the first float to driving torque for driven equipment, wherein the natural energy extraction apparatus is installed on a body of water.

In the energy extraction apparatus of the present invention, the second float corresponding to the float of the conventional natural energy extraction apparatus does not need an apparatus for supporting the first float because the vertical rotating shaft is the first float and is supported by buoyancy of water. The second float corresponding to the float of the conventional natural energy extraction apparatus does not need to prevent swing of the first float because inherent swinging of the first float is anticipated. A power transmission device is disposed in an open space between the first float and the second float. Therefore, the internal structure of the second float corresponding to the float of the conventional natural energy extraction apparatus becomes simpler than that of the float of the conventional natural energy extraction apparatus, the second float and the mooring apparatus become more compact than those of the conventional natural energy extraction apparatus, and production cost of the second float becomes lower than that of the float of the conventional natural energy extraction apparatus. The driven equipment is, for example, a power generator, a pump, a compressor, a flywheel for energy storage, etc.

In accordance with the present invention, there is provided a wind power generator comprising the aforementioned natural energy extraction apparatus and a vertical-axis wind turbine fixed to the first float to extend upward, wherein the driven equipment is a power generator.

A wind power generator is implemented by fixing a vertical-axis wind turbine to the first float, converting rotational kinetic energy of the first float to driving torque for a power generator, and finally converting the driving torque to electric power. The first float, which has a large moment of inertia, can absorb fluctuation of wind speed to prevent fluctuation of output of the power generator, and exhibit gyro-effect to stabilize the extending direction of the rotating shaft of the wind turbine.

In accordance with a preferred aspect of the present invention, the aforementioned wind power generator comprises a plurality of power transmission devices and power generators.

In a case where a plurality of power transmission devices and power generators are disposed, the size of each power transmission device and power generator becomes smaller and development cost and production cost of the individual power transmission devices and power generators becomes lower than those in a case where a single power transmission device and a single power generator of large capacity are disposed, and further, it becomes possible to service or replace one or more of them, while continuing power generation.

In accordance with a preferred aspect of the present invention, the aforementioned wind power generator further comprises a weight fixed to or suspended from a lower end of the first float.

When a weight is fixed to or suspended from a lower end of the first float, stability of the wind power generator against waves or beam winds is enhanced.

In accordance with a preferred aspect of the present invention, the aforementioned wind power generator further comprises a lightning arrester attached to the vertical-axis wind turbine.

The current of a lightning strike therefore flows through the vertical-axis wind turbine and the first float to discharge into water, and not through the power transmission devices and the driven equipment, i.e., the power generator. Thus, the power generator is protected from lightning strike.

In accordance with a preferred aspect of the present invention, the aforementioned wind power generator further comprises a brake accommodated in the first float and capable of radially projecting from and retracting into a circumferential side surface of the first float, or a brake attached to a circumferential side surface of the first float and capable of swinging between a closed position wherein the brake extends along the circumferential side surface of the first float and an open position wherein the brake radially projects from the circumferential side surface of the first float.

When the first float is provided with a brake, it becomes possible to urgently stop the rotating first float when an accident occurs.

In accordance with a preferred aspect of the present invention, the first float comprises a ballast water storage space, and the ballast water storage space is filled with ballast water during power generation.

When the first float comprises a ballast water storage space, it becomes possible, during maintenance work on the wind turbine, to discharge ballast water, thereby raising and tipping the first float, or, when a weight is suspended from the first float, to let out the suspension rope to seat the weight on the bottom of the body of water, and thereafter, discharge ballast water, thereby raising and tipping the first float. Thus, the vertical-axis wind turbine comes close to the water surface, and maintenance work on the wind turbine becomes easy.

In accordance with a preferred aspect of the present invention, the aforementioned wind power generator comprises a pair of first floats, a pair of vertical-axis wind turbines each attached to one of the pair of first floats and extending upward, a second float moored to surround the pair of first floats, and power transmission devices attached to the second float to convert rotational kinetic energies of the first floats to driving torque for driven equipment. The second float is moored by multi-point mooring with an intermediate buoy, and mooring cables connecting the second float to the intermediate buoy are arranged, as seen from above, line-symmetrically in relation to a second straight line that crosses at right angles a first straight line extending between rotation axes of the pair of first floats at a mid-position of the first straight line between the pair of first floats.

When mooring cables connecting the second float to the intermediate buoy are arranged, as seen from above, line-symmetrically in relation to a second straight line that crosses at right angles a first straight line extending between rotation axes of the pair of first floats at a mid-position of the first straight line between the pair of first floats, the second float is positioned leeward of the intermediate buoy during the operation of the wind power generator, the first straight line connecting the rotation axes of the pair of first floats is directed to the wind current in face to face opposition, i.e., the wind current flows at right angles to the first straight line, and the pair of vertical-axis wind turbines rotate in opposite directions. As a result, rotational torque transmitted from one of the pair of first floats to the second float and rotational torque transmitted from the other of the pair of first floats to the second float cancel each other, so that rotation of the second float is prevented. Further, transverse forces impressed on the pair of vertical-axis wind turbines caused by Magnus effect cancel each other. As a result, mooring becomes easy and mooring cost decreases.

In accordance with a preferred aspect of the present invention, the vertical-axis wind turbine is a lift-type vertical-axis wind turbine provided with a plurality of vertically extending airfoils forming turbine blades circumferentially distanced from each other, and the airfoils are twisted around a vertical rotating shaft of the wind turbine, while maintaining circumferential relative positions among them.

When a plurality of vertically extending airfoils forming turbine blades are twisted around a vertical rotating shaft of the wind turbine, while maintaining circumferential relative positions among them, each airfoil extends, as seen from above, from the base portion to the tip portion in the circumferential direction around the vertical rotating shaft of the wind turbine. Thus, fluctuation of torque during rotation of the wind turbine decreases. Further, a part of at least one of the plurality of airfoils is located in an air current moving from the trailing edge to the leading edge of the airfoil. Thus, vortices are generated near the leading edge of the airfoil to generate negative pressure, thereby generating starting torque. As a result, the wind turbine starts easily.

In accordance with a preferred aspect of the present invention, the vertical-axis wind turbine is a lift-type vertical-axis wind turbine provided with a plurality of vertically extending airfoils forming turbine blades circumferentially distanced from each other, and each airfoil can swing between a first position wherein an upper end thereof is close to a vertical rotating shaft of the wind turbine and a second position wherein the upper end thereof is distanced from the vertical rotating shaft of the wind turbine.

With this structure, it becomes possible, when the wind turbine is serviced, to swing the airfoils so as to move the upper ends of the airfoils close to the water surface, thereby making maintenance work easy.

In accordance with a preferred aspect of the present invention, the vertical-axis wind turbine is provided with arms radially extending from a vertical rotating shaft of the wind turbine to connect with turbine blades, thereby supporting the turbine blades, and a cover of airfoil-shaped cross section is fixed to each arm.

In accordance with a preferred aspect of the present invention, the vertical-axis wind turbine is provided with arms radially extending from a vertical rotating shaft to connect with turbine blades, thereby supporting the turbine blades, a cover of airfoil-shaped cross section is attached to each arm, and the whole body of the cover is enabled to rotate around a longitudinal axis of the arm or a trailing edge portion of the cover is enabled to rotate around an axis parallel to the longitudinal axis of the arm.

When the vertical-axis wind turbine is provided with arms radially extending from the vertical rotating shaft to connect with turbine blades, thereby supporting the turbine blades, each arm is desirably provided with a cover of airfoil-shaped cross section in order to decrease air resistance of the arm.

In the offshore wind natural energy extraction apparatus of Patent Document No. 1, the vertical rotating shaft extends nearly vertically. Therefore, airfoils formed by covers connected to arms for connecting the vertical rotating shaft to turbine blades do not have attack angles against relative air current and do not generate lifts. On the other hand, in the wind power generator in accordance with the present invention, the vertical-axis wind turbine inclines toward downstream of the air current, and the airfoils formed by covers have attack angles against relative air current to generate lifts and also induced drags at tips of the airfoils. Therefore, influence of lift and induced drag on torque generated by the vertical-axis wind turbine should be considered.

When the aspect ratio of the airfoil formed by the cover is large, induced drag is small and lift-drag ratio is large. Therefore, it is desirable to fix the cover to the arm so as to make the lift generated by the cover contribute to generation of torque by the vertical-axis wind turbine. On the other hand, when the aspect ratio of the airfoil formed by the cover is small, induced drag is large and lift-drag ratio is small. Therefore, it is desirable to make the whole body or a trailing edge portion of the cover rotatable so as to restrain generation of lift and induced drag by the cover.

In accordance with the present invention, there is provided a water current power generator comprising the aforementioned natural energy extraction apparatus and a vertical-axis water turbine fixed to the first float to extend downward, wherein the driven equipment is a power generator.

A water current power generator is implemented by fixing a vertical-axis water turbine to the first float to make the water turbine extend downward, converting rotational kinetic energy of the first float to driving torque of a power generator, and finally converting the driving torque to electric power. The first float, which has a large moment of inertia, can absorb fluctuation of water current speed and prevent fluctuation of output of the power generator, and exhibit gyro-effect to stabilize the extending direction of a rotating shaft of the water turbine.

In accordance with a preferred aspect of the present invention, the aforementioned water current power generator comprises a plurality of power transmission devices and power generators. In a case where a plurality of power transmission devices and power generators are disposed, the size of each power transmission device and power generator becomes smaller and development cost and production cost of the individual power transmission devices and power generators becomes lower than those in a case where a single power transmission device and a single power generator of large capacity are disposed, and further, it becomes possible to carry out servicing or replacement of one or more of them, while continuing power generation.

In accordance with a preferred aspect of the present invention, the aforementioned water current power generator further comprises a weight fixed to or suspended from a lower end of a vertical rotating shaft of the vertical-axis water turbine.

When a weight is fixed to or suspended from a lower end of a vertical rotating shaft of the vertical-axis water turbine, stability of the water current power generator against waves and tidal currents is enhanced.

In accordance with a preferred aspect of the present invention, the aforementioned water current power generator further comprises a brake accommodated in the first float and capable of radially projecting from and retracting into a circumferential side surface of the first float, or a brake attached to a circumferential side surface of the first float and capable of swinging between a closed position wherein the brake extends along the circumferential side surface of the first float and an open position wherein the brake radially projects from the circumferential side surface of the first float.

When the first float is provided with a brake, it becomes possible to urgently stop the rotating first float when an accident occurs.

In accordance with a preferred aspect of the present invention, the first float and the vertical-axis water turbine comprise ballast water storage spaces, and the ballast water storage spaces are filled with ballast water during power generation.

When the first float and the vertical-axis water turbine comprise ballast water storage spaces, it becomes possible during maintenance work on the water turbine to discharge ballast water, thereby raising and tipping the first float and the vertical-axis water turbine, or, when a weight is suspended from the vertical-axis water turbine, to let out the suspension rope to seat the weight on the bottom of the body of water, and discharge ballast water, thereby raising and tipping the first float and the vertical-axis water turbine. Thus, the vertical-axis water turbine comes close to the water surface, and maintenance work becomes easy.

In accordance with a preferred aspect of the present invention, the aforementioned water current power generator comprises a pair of first floats, a pair of vertical-axis water turbines each attached to one of the pair of first floats and extending downward, a second float moored to surround the pair of first floats, and power transmission devices for converting rotational kinetic energies of the first floats to driving torque for driven equipment, wherein the second float is moored by multi-point mooring with an intermediate buoy, and mooring cables connecting the second float to the intermediate buoy are arranged, as seen from above, line-symmetrically in relation to a second straight line that crosses at right angles a first straight line extending between rotation axes of the pair of first floats at a mid-position of the first straight line between the pair of first floats.

When mooring cables connecting the second float to the intermediate buoy are arranged, as seen from above, line-symmetrically in relation to a second straight line that crosses at right angles a first straight line extending between rotation axes of the pair of first floats at a mid-position of the first straight line between the pair of first floats, the second float is positioned leeward of the intermediate buoy during the operation of the water current power generator, the first straight line connecting the rotation axes of the pair of first floats is directed to the water current in face to face opposition, i.e., the water current flows at right angles to the first straight line, and the pair of vertical axis water turbines rotate in opposite directions. As a result, rotational torque transmitted from one of the pair of first floats to the second float and rotational torque transmitted from the other of the pair of first floats to the second float cancel each other, and rotation of the second float is prevented. Further, transverse forces impressed on the pair of vertical axis water turbines caused by Magnus effect cancel each other. As a result, mooring is made easy and mooring cost decreases.

In accordance with a preferred aspect of the present invention, the vertical-axis water turbine is a lift-type vertical-axis water turbine provided with a plurality of vertically extending hydrofoils forming turbine blades circumferentially distanced from each other, and the hydrofoils are twisted around a vertical rotating shaft of the water turbine, while maintaining circumferential relative positions among them.

When the plurality of vertically extending hydrofoils forming turbine blades are twisted around a vertical rotating shaft of the water turbine, while maintaining circumferential relative positions among them, each hydrofoil extends, as seen from above, from the base portion to the tip portion in the circumferential direction around the vertical rotating shaft of the water turbine. Thus, fluctuation of torque during rotation of the water turbine decreases. Further, a part of at least one of the plurality of hydrofoils is located in a water current moving from the trailing edge to the leading edge of the hydrofoil. Thus, vortices are generated near the leading edge to generate negative pressure, thereby generating starting torque. As a result, the water turbine starts easily.

In accordance with a preferred aspect of the present invention, the vertical-axis water turbine is provided with arms radially extending from a vertical rotating shaft of the water turbine to connect with turbine blades, thereby supporting the turbine blades, and a cover of hydrofoil-shaped cross section is fixed to each arm.

In accordance with a preferred aspect of the present invention, the vertical-axis water turbine is provided with arms radially extending from a vertical rotating shaft to connect with turbine blades, thereby supporting the turbine blades, a cover of hydrofoil-shaped cross section is attached to each arm, and the whole body of the cover is enabled to rotate around a longitudinal axis of the arm or a trailing edge portion of the cover is enabled to rotate around an axis parallel to the longitudinal axis of the arm.

When the vertical-axis water turbine is provided with arms radially extending from the vertical rotating shaft to connect with turbine blades, thereby supporting the turbine blades, each arm is desirably provided with a cover of hydrofoil-shaped cross section in order to decrease hydraulic resistance of the arm.

In the offshore wind natural energy extraction apparatus of Patent Document No. 1, the vertical rotating shaft extends nearly vertically. Therefore, airfoils formed by covers connected to arms for connecting the vertical rotating shaft to turbine blades do not have attack angles against relative air current and do not generate lifts. On the other hand, in the water current power generator in accordance with the present invention, the vertical-axis water turbine inclines toward downstream of the water current, and the hydrofoils formed by the covers have attack angles against relative water current to generate lifts and also induced drags at tips of the hydrofoils. Therefore, influence of lift and induced drag on torque generated by the vertical-axis water turbine should be considered.

When the aspect ratio of the hydrofoil formed by the cover is large, induced drag is small and lift-drag ratio is large. Therefore, it is desirable to fix the cover to the arm so as to make the lift generated by the cover contribute to generation of torque by the vertical-axis water turbine. On the other hand, when the aspect ratio of the hydrofoil formed by the cover is small, induced drag is large and lift-drag ratio is small. Therefore, it is desirable to make the whole body or a trailing edge portion of the cover rotatable so as to restrain generation of lift and induced drag by the cover.

In accordance with the present invention, there is provided an energy storage apparatus comprising the aforementioned energy extraction apparatus, wherein the driven equipment is a power generator, and wherein electric power is supplied to the power generator to be converted to rotational kinetic energy of the first float, and the rotational kinetic energy is stored in the first float.

An energy storage apparatus is implemented by converting electric power supplied to the generator to rotational kinetic energy of the first float.

In accordance with a preferred aspect of the present invention, the aforementioned energy storage apparatus comprises a pair of first floats, a second float moored to surround the first floats, wherein the second float is moored by multi-point mooring with an intermediate buoy, and mooring cables connecting the second float to the intermediate buoy are arranged, as seen from above, line-symmetrically in relation to a second straight line that crosses at right angles a first straight line extending between rotation axes of the pair of first floats at a mid-position of the first straight line between the pair of first floats.

When the pair of first floats are rotated in opposite directions during operation of the energy storage apparatus, rotational torques transmitted from the generators to the second float cancel each other and rotation of the second float is prevented. As a result, mooring of the second float becomes easy and mooring cost decreases.

BRIEF DESCRIPTION OF THE DRAWINGS

FIG. 2 is a set of side views of applications of a natural energy extraction apparatus in accordance with a preferred embodiment of the present invention. (a) is a side view of a wind power generator, (b) is a side view of a water current power generator, and (c) is a side view of an energy storage apparatus.

FIG. 4 is a set of structural views of a wind power generator, which is an application of a natural energy extraction apparatus in accordance with a preferred embodiment of the present invention. (a) is a perspective view, and (b) is a view in the direction of arrows b-b in (a).

MODES FOR CARRYING OUT THE INVENTION

Figure 1:
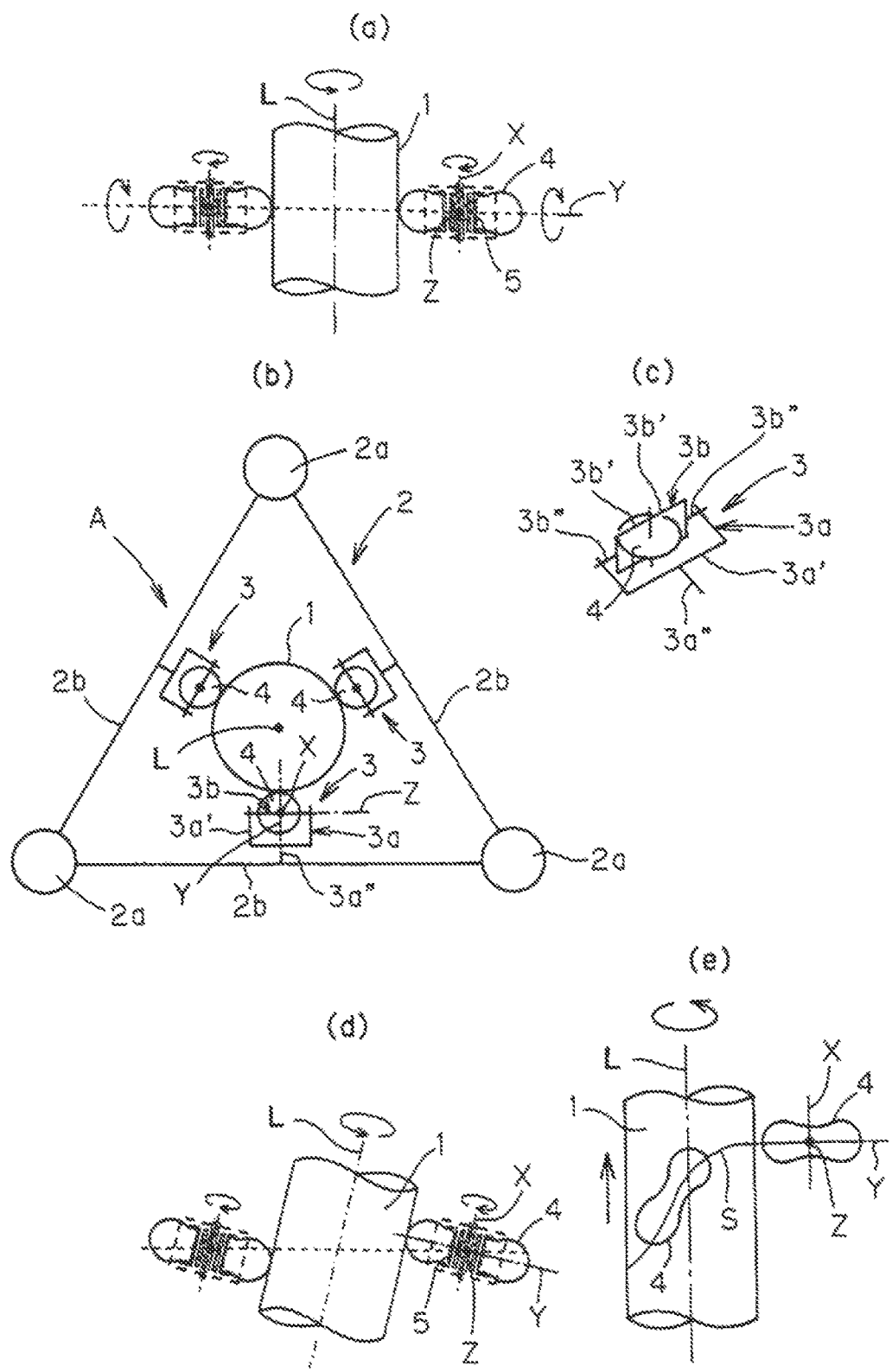
FIG. 1 is a set of structural views of a natural energy extraction apparatus in accordance with a preferred embodiment of the present invention. (a) is a partial side view when the first float extends vertically, (b) is a top plan view, (c) is a schematic perspective view of a roller and support arms, (d) is a partial side view when the first float extends slantedly, and (e) is a partial side view showing a relation between the attitude of the roller and the locus of a contact point between the circumferential side surface of the first float and the roller when the first float moves upward.

Natural energy extraction apparatuses in accordance with preferred embodiments of the present invention will be described.

As shown in FIGS. 1(a), 1(b) and 1(c), a natural energy extraction apparatus A comprises a first float 1 of circular cylindrical shape forming a vertical rotating shaft, i.e., a vertically extending rotating shaft, and a second float 2 moored on a body of water to surround the first float 1.

The second float 2 comprises three floats 2*a* of circular cylindrical shape and three arm members 2*b* for connecting each adjacent pair of floats 2*a*. Each float 2*a* is located at one of three apexes of an equilateral triangle, at the center of which the first float 1 is located as seen from above. The arm members 2*b* are located in the same plane.

A support arm 3 is attached to the longitudinal middle of each arm member 2*b*. The support arm 3 comprises a first portion 3*a* of tuning fork shape and a second portion 3*b* of the shape of a pair of integrally united tuning forks. The first portion 3*a* comprises a U-shaped yoke 3*a*' and a shaft 3*a*" extending from the base portion of the yoke 3*a*'. The second portion 3*b* comprises a pair of tuning fork shaped members. Each tuning fork shaped member comprises a U-shaped yoke 3*b*' and a shaft 3*b*" extending from the base portion of the yoke 3*b*'. The pair of tuning fork shaped members are integrally united with the U-shaped yokes 3*b*' abutted on each other. The pair of shafts 3*b*" of the second portion 3*b* are rotatably supported by the U-shaped yoke 3*a*' of the first portion 3*a*. The shaft 3*a*" is directed at right angles to the arm member 2*b* and attached to the longitudinal middle of the arm member 2*b*. The support arm 3 is located in the plane in which the three arm members 2*b* extend and extends toward a central axis L of the first float 1. The shaft 3*a*" of the first portion 3*a* is attached to the arm member 2*b* rotatably around the central axis of the shaft 3*a*" and projectably from and retractably into the arm member 2*b* within a predetermined stroke under biasing force of a spring which is not shown in FIG. 1. Each arm member 2*b* is provided with one support arm 3.

A roller 4 of thick circular plate shape is rotatably attached to the second portion 3*b* of each support arm 3.

The roller 4 is supported by the support arm 3 rotatably around a central axis X of the thick circular plate, an axis Y crossing the axis X at right angles and extending toward the central axis L of the first float 1 in a plane crossing the axis X at right angles at the middle of the thickness of the thick circular plate, and an axis Z crossing the axes X and Y at right angles at their point of intersection in the plane crossing the axis X at right angles at the middle of the thickness of the thick circular plate.

Three rollers 4 surround the first float 1 at intervals of 120 degrees measured in the circumferential direction as seen from above. Circumferential side surfaces of the rollers 4 abut the circumferential side surface of the first float 1. The circumferential side surfaces of the rollers 4 are forced on the circumferential side surface of the first float 1 by the springs forcing the shafts 3*a*" of the support arms 3. As aforementioned, the springs are not shown in FIG. 1.

Each roller 4 is provided with a power generator 5.

The natural energy extraction apparatus A is installed on a body of water. The second float 2 is moored by an anchor and a chain or a wire, which are not shown in FIG. 1, and floats on the water surface. The first float 1 floats freely except that horizontal movement is restricted by the rollers 4. The rollers 4 and the power generators 5 are located above the water surface.

In the energy extraction apparatus A, rotation of the first float 1 is transmitted to the rollers 4 so as to drive the power generators 5 mounted on the rollers 4, thereby generating electric power. Rotational kinetic energy of the first float 1 is converted to driving torques of the power generators 5, and finally converted to electric energy and taken out.

Each roller 4 can rotate around not only its central axis X but also axes Y and Z crossing the axis X at right angles. Thus, the roller 4 abuts the first float 1 in a manner that minimizes resistance between the roller 4 and the rotating first float 1. As a result, when the first float 1 swings and inclines as shown in FIG. 1 (*d*), the roller 4 rotates around the axis Z to abut the circumferential side surface of the first float 1, with the axis X extending parallel to the central axis L of the first float 1, thereby to be driven by the first float 1. When the first float 1 moves up and down due to waves, the roller 4 rotates around axis Y to abut the circumferential side surface of the first float 1, with its circumferential side surface directed along the locus of the contact point between the circumferential side surface of the first float 1 and the circumferential side surface of the roller 4, thereby to be driven by the first float 1.

Each roller 4 is forced onto the circumferential side surface of the first float 1 as aforementioned. Therefore, the roller 4 reliably abuts the circumferential side surface of the first float 1 to be driven by the first float 1, even if the first float 1 swings and inclines, or moves up and down, or moves horizontally.

The second float 2 corresponding to the float of the conventional natural energy extraction apparatus does not need an apparatus for supporting the first float 1 because the first float 1 corresponding to the vertical rotating shaft of the conventional natural energy extraction apparatus is supported by buoyancy of the water. The second float 2 corresponding to the float of the conventional natural energy extraction apparatus does not need to prevent swing of the first float 1 because inherent swinging of the first float 1 is anticipated. The rollers 4 and the power generators 5 are disposed in an open space between the first float 1 and the second float 2. Therefore, the internal structure of the second float 2 corresponding to the float of the conventional natural energy extraction apparatus becomes simpler than that of the float of the conventional natural energy extraction apparatus, the second float 2 and a mooring apparatus become more compact than the float and the mooring apparatus of the conventional natural energy extraction apparatus, and production cost of the second float 2 becomes lower than that of the float of the conventional natural energy extraction apparatus, and finally production cost of the natural energy extraction apparatus A becomes lower than that of the conventional natural energy extraction apparatus.

When a plurality of rollers 4 and power generators 5 are disposed, the sizes of the roller 4 and the power generator 5 become smaller and development costs and production costs of the roller 4 and the power generator 5 become lower than those in a case where a single large roller and a single power generator of large capacity are disposed. When four or more rollers 4 and power generators 5 are disposed, it becomes possible to carry out servicing or replacement of one or more of them, while continuing electric power generation.

As shown in FIG. 2(*a*), a wind power generator C is implemented by fixing a vertical rotating shaft B' of a vertical-axis wind turbine B to the upper end of the first float 1 of the natural energy extraction apparatus A, and converting the rotational kinetic energy of the first float 1 to electric energy. The first float 1, which has a large moment of inertia, can absorb fluctuation of wind speed and prevent fluctuation of output of generated electric power, and exhibit gyro-effect to stabilize the extending direction of the vertical rotating shaft B' of the vertical-axis wind turbine B.

As shown in FIG. 2(*b*), a water current power generator E is implemented by fixing a vertical rotating shaft D' of a vertical-axis water turbine D to the lower end of the first float 1 of the natural energy extraction apparatus A, and converting the rotational kinetic energy of the first float 1 to electric energy. The first float 1, which has a large moment of inertia, can absorb fluctuation of water current speed and prevent fluctuation of output of generated electric power, and exhibit gyro-effect to stabilize the extending direction of the vertical rotating shaft D' of the vertical-axis water turbine D.

As shown in FIG. 2(*c*), an energy storage apparatus F is implemented by converting electric power to rotational kinetic energy of the first float 1 through the generators 5 and the rollers 4 in the natural energy extraction apparatus A. The rotational kinetic energy stored in the first float 1 can be taken out as electric energy whenever needed.

The natural energy extraction apparatus A can be installed on a body of water such as a sea, lake, marsh, river, etc., to form an energy storage apparatus.

In the aforementioned preferred embodiments, the rotational kinetic energy of the first float 1 is converted to driving torque of the generators 5, and finally taken out as electric energy. However, instead of converting the rotational kinetic energy of the first float 1 to electric energy, it is possible to convert the rotational kinetic energy of the first float 1 directly to driving torque of a pump, compressor, separately installed energy storage apparatus such as a flywheel, etc.

Figure 3:
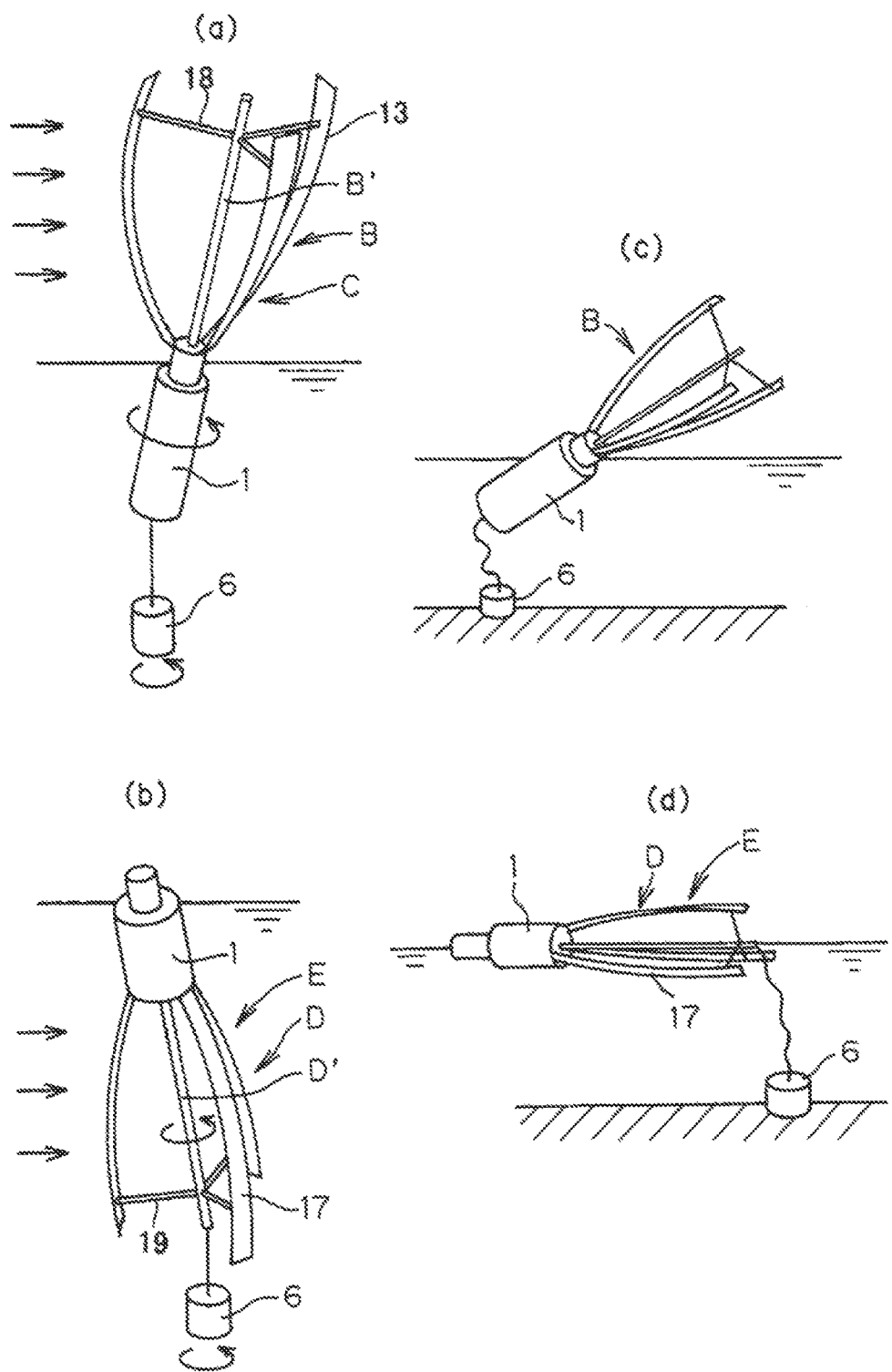
FIG. 3 is a set of perspective views of applications of a natural energy extraction apparatus in accordance with a preferred embodiment of the present invention. (a) and (c) are perspective views of a wind power generator, and (b) and (d) are perspective views of a water current power generator.

It is possible, as shown in FIG. 3(*a*), to suspend a weight 6 from the lower end of the first float 1 of the wind power generator C of FIG. 2(*a*), or as shown in FIG. 3(*b*), suspend a weight 6 from the lower end of the vertical rotating shaft D' of the vertical axis water turbine D of the water power generator E of FIG. 2(*b*). When the weight 6 is suspended from the first float 1 or the vertical rotating shaft D', stability of the first float 1, or stabilities of the wind current power generator C and the water current power generator E against waves, beam wind, or tidal current are enhanced. It is possible, instead of suspending the weight 6 from the lower end of the first float 1 or the vertical rotating shaft D', to fix the weight 6 to the lower end of the first float 1 or the vertical rotating shaft D'.

It is possible, as shown in FIG. 4(*a*), to attach lightning arresters 7 to the vertical rotating shaft B' or airfoils 13 forming turbine blades of the vertical-axis wind turbine B of the wind power generator C of FIG. 2(*a*). The current of a lightning strike flows through the lightning arrester 7, the vertical-axis wind turbine B and the first float 1 to discharge into the water, and not through the power transmission devices, i.e., the rollers 4, and the driven equipment, i.e., the power generators 5. Thus, the power generators 5 are protected from lightning strike.

The wind power generator C of FIG. 2(*a*) can further comprise brakes 8 accommodated in the first float 1 and capable of radially projecting from and retracting into a circumferential side surface of the first float 1 as shown in FIGS. 4(*a*) and 4(*b*), or brakes 9 attached to a circumferential side surface of the first float 1 and capable of swinging between a closed position wherein the brakes 9 extend along the circumferential side surface of the first float 1 and an open position wherein the brakes 9 radially project from the circumferential side surface of the first float 1 as shown in FIG. 4(*b*). When the first float 1 is provided with brakes 8 or 9, it becomes possible to urgently stop the rotating first float 1 when an accident occurs.

The first float 1 of the wind power generator C of FIG. 2(*a*) can comprise a ballast water storage space to be filled with ballast water during power generation, thereby standing the first float 1 upright as shown in FIG. 3(*a*). When the first float 1 comprises a ballast water storage space, it becomes possible, during maintenance work on the vertical-axis wind turbine B, to discharge ballast water, thereby raising and tipping the first float 1, or, when the weight 6 is suspended from the first float 1, to let out the suspension rope to seat the weight 6 on the bottom of the body of water, and discharge ballast water, thereby raising and tipping the first float 1 as shown in FIG. 3(*c*). Thus, the vertical-axis wind turbine B comes close to the water surface, and maintenance work becomes easy.

Figure 5:
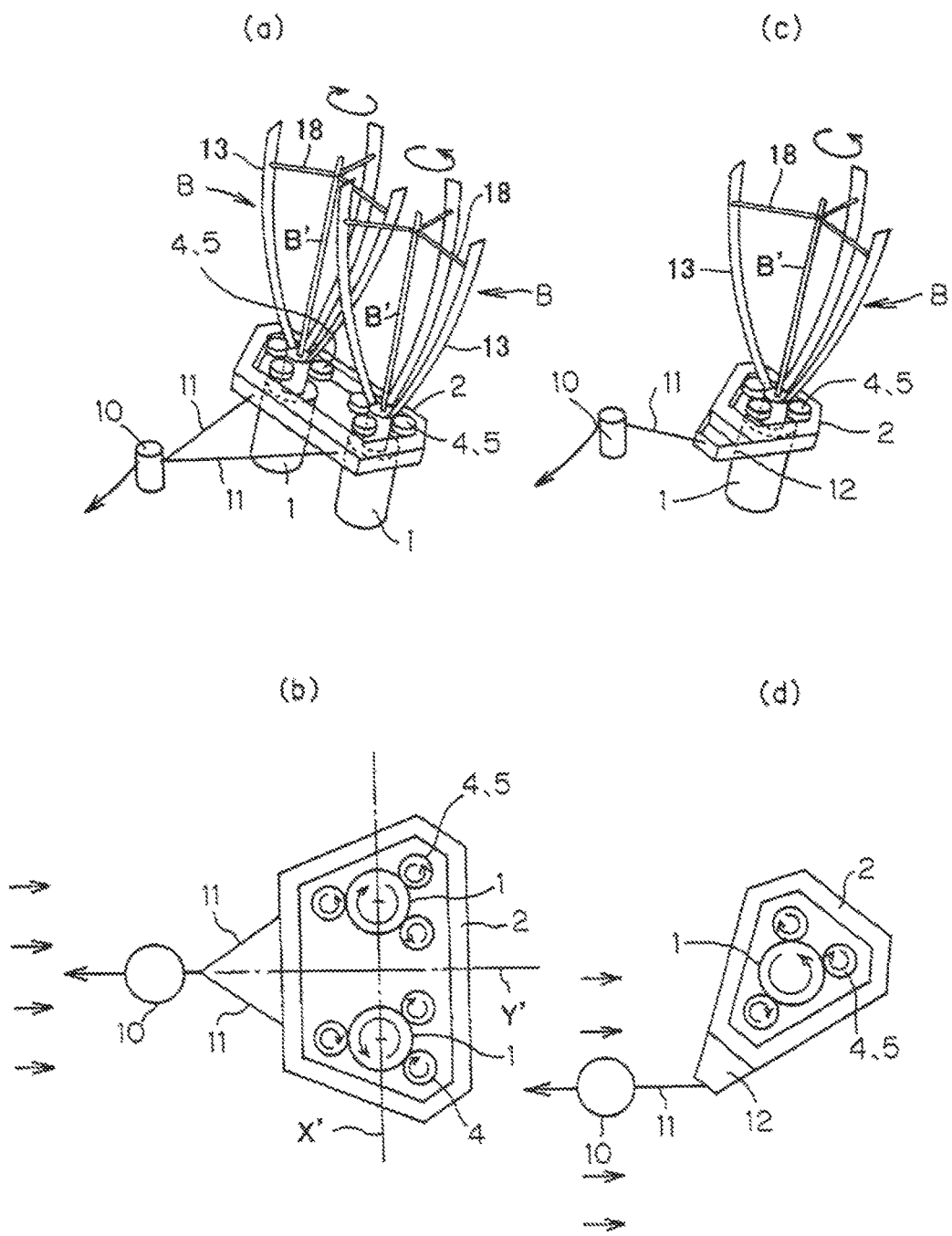
FIG. 5 is a set of structural views of moored wind power generators, which are applications of a natural energy extraction apparatus in accordance with a preferred embodiment of the present invention. (a) is a perspective view of a wind power generator provided with a pair of wind turbines, (b) is a top plan view of a wind power generator provided with a pair of wind turbines, wherein the wind turbines are omitted, (c) is a perspective view of a wind power generator provided with a single wind turbine, and (d) is a top plan view of a wind power generator provided with a single wind turbine, wherein the wind turbine is omitted.

As shown in FIGS. 5(*a*) and 5(*b*), a wind power generator can comprise a pair of first floats 1, a pair of vertical-axis wind turbines B, each of which is fixed to one of the pair of first floats 1 and extends upward, a second float 2 surrounding the pair of first floats 1, a pair of sets of rollers 4, each of which comprises three rollers 4 attached to the second float 2 to abut on one of the first floats 1, and generators 5, each of which is mounted on one of the rollers 4. The second float 2 is moored by multipoint mooring with an intermediate buoy 10. A pair of mooring cables 11 connecting the second float 2 to the intermediate buoy 10 are arranged, as seen from above, line-symmetrically in relation to a second straight line Y' that crosses at right angles a first straight line X' extending between the rotation axes of the pair of first floats 1 at a mid-position of the first straight line X' between the pair of first floats 1.

When mooring cables 11 connecting the second float 2 to the intermediate buoy 10 are arranged, as seen from above, line-symmetrically in relation to a second straight line Y' that crosses at right angles a first straight line X' extending between rotation axes of the pair of first floats 1 at a mid-position of the first straight line X' between the pair of first floats 1, the second float 2 is positioned leeward of the intermediate buoy 10 during the operation of the wind power generator, the first straight line X' connecting the rotation axes of the pair of first floats 1 to each other is directed to the wind current in face to face opposition, i.e., the wind current flows at right angles to the first straight line X', and the pair of vertical-axis wind turbines B rotate in opposite directions. As a result, rotational torque transmitted from one of the pair of first floats 1 to the second float 2 and rotational torque transmitted from the other of the pair of first floats 1 to the second float 2 cancel each other, and rotation of the second float 2 is prevented. Further, transverse forces impressed on the pair of vertical-axis wind turbines B caused by Magnus effect cancel each other. As a result, mooring becomes easy and mooring cost decreases.

When a wind power generator comprising a single vertical-axis wind turbine B, a single first float 1 and a second float 2 is moored, it is desirable, as shown in FIGS. 5(*c*) and 5(*d*), to fix a radially outwardly extending arm member 12 to the second float 2, and extend a mooring cable 11 from the arm member 12 to an intermediate buoy 10, thereby mooring the second float 2 by single point mooring with an intermediate buoy. The arm member 12 lengthens the rotational lever of the second float 2 to decrease tensile force generated in the mooring cable 11 so as to cancel the rotational torque transmitted from the first float 1 to the second float 2.

Figure 6:
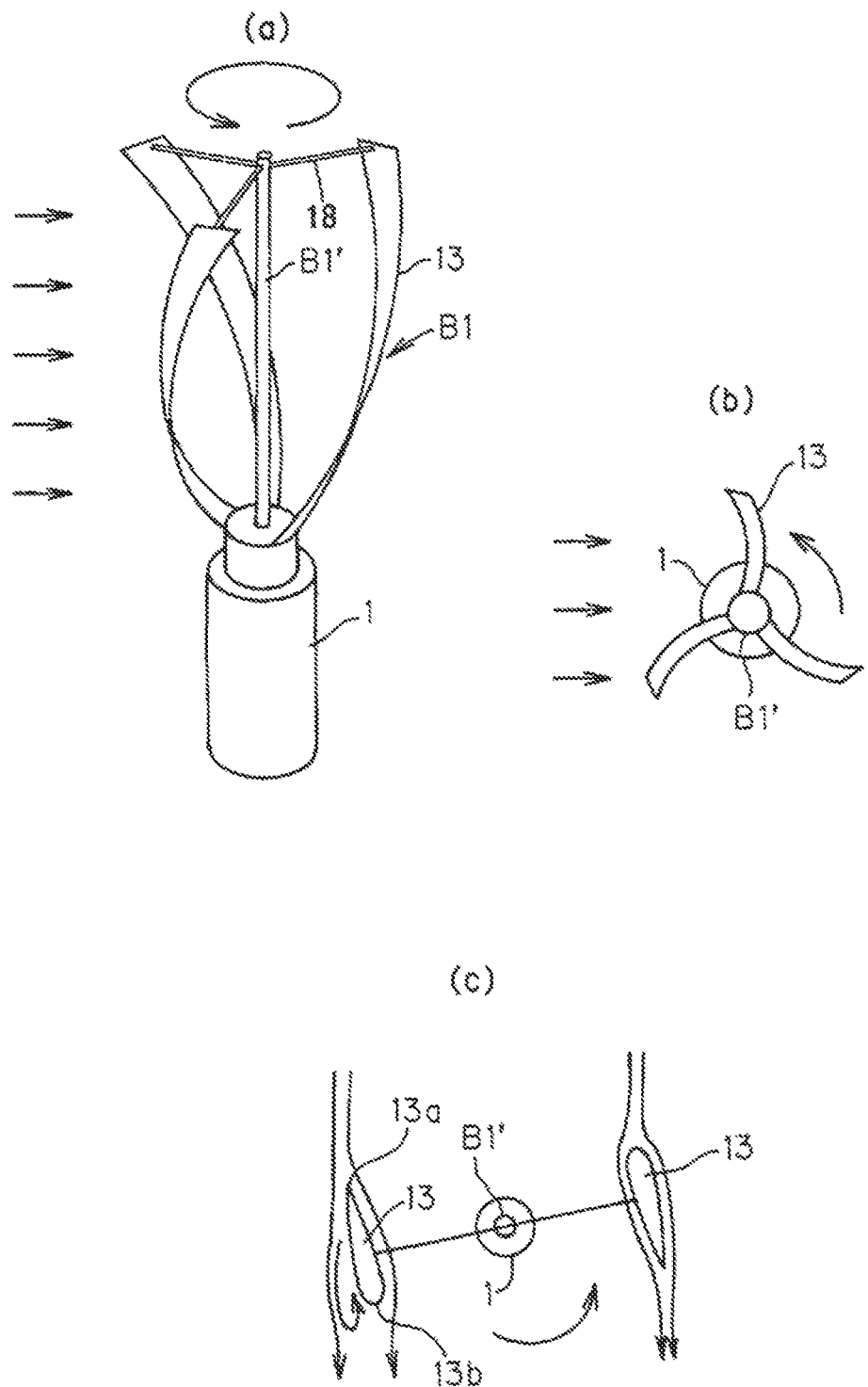
FIG. 6 is a set of structural views of a wind power generator, which is an application of a natural energy extraction apparatus in accordance with a preferred embodiment of the present invention. (a) is a perspective view, and (b) and (c) are top plan views.

In the wind power generator C of FIG. 2(*a*), it is possible to make the vertical-axis wind turbine B a lift-type vertical-axis wind turbine B1, wherein a plurality of vertically extending airfoils 13 of large length are disposed circumferentially distanced from each other to form turbine blades, and further make the lift-type vertical-axis wind turbine B1 a helical wind turbine by twisting the airfoils 13 around a vertical rotating shaft B1' of the wind turbine, while maintaining circumferential relative positions among airfoils 13. When the plurality of vertically extending airfoils 13 are twisted around the vertical rotating shaft B1' of the wind turbine, while maintaining circumferential relative positions among the airfoils 13, each airfoil 13 extends, as seen from above, from the base portion to the tip portion in the circumferential direction around the vertical rotating shaft B1' of the wind turbine as shown in FIG. 6(b). Thus, fluctuation of torque during rotation of the vertical-axis wind turbine decreases. Further, as shown in FIG. 6(c), a part of at least one of the plurality of airfoils 13 is located in an air current moving from the trailing edge 13a to the leading edge 13b of the airfoil 13 at the start of the vertical-axis wind turbine B1. Thus, vortices are generated near the leading edge 13b to generate negative pressure, thereby generating starting torque. As a result, the vertical-axis wind turbine B1 starts easily.

Figure 7:
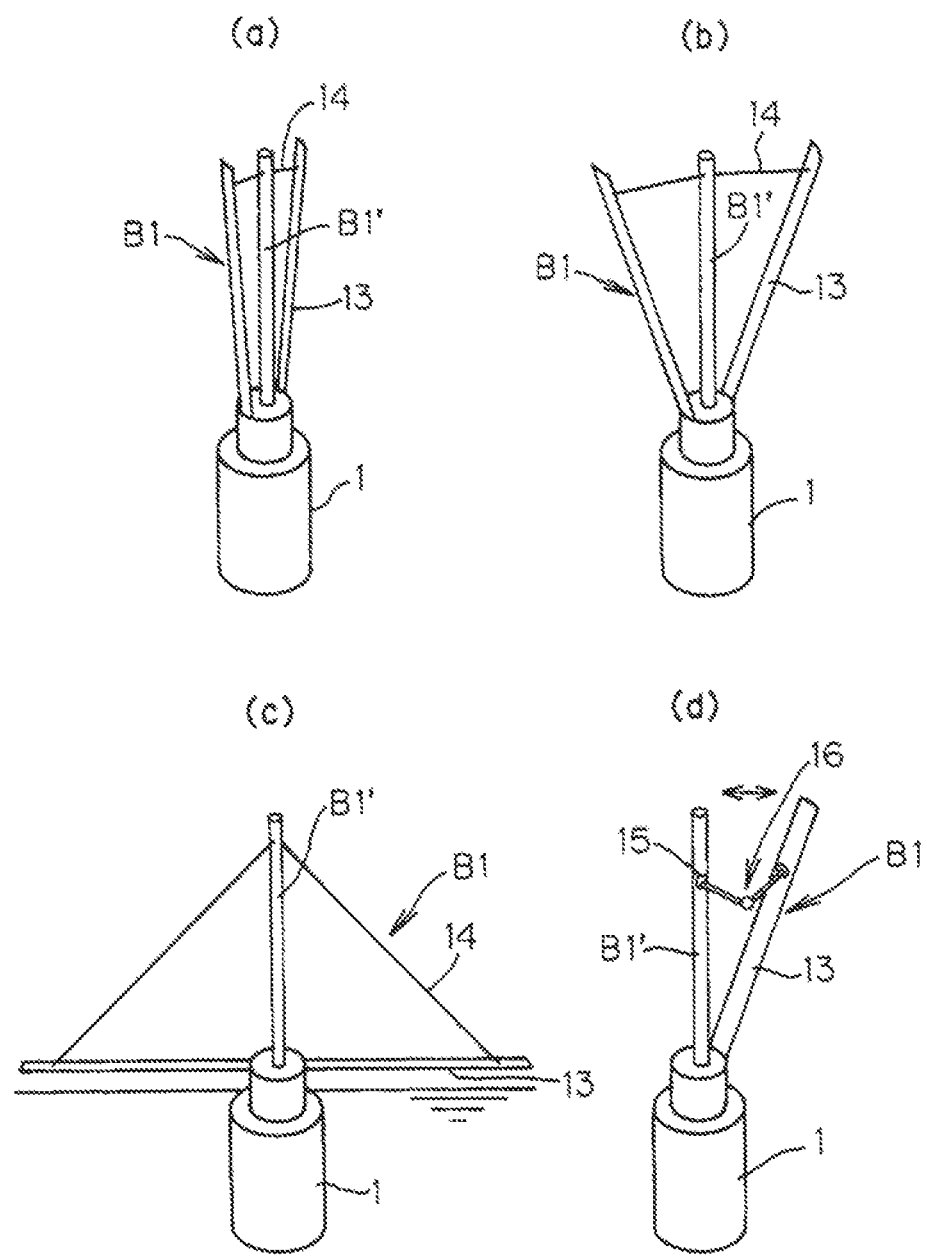
FIG. 7 is a set of perspective views of wind power generators, which are applications of a natural energy extraction apparatus in accordance with a preferred embodiment of the present invention.

As shown in FIGS. 7(a) and 7(b), the vertical-axis wind turbine can be a lift-type vertical-axis wind turbine B1 comprising a plurality of vertically extending airfoils 13 of large length circumferentially distanced from each other to form turbine blades, wherein each airfoil 13 can swing between a first position shown in FIG. 7(a) where an upper end thereof is close to a vertical rotating shaft B1' of the wind turbine and a second position shown in FIGS. 7(b) and 7(c) where the upper end thereof is distanced from the vertical rotating shaft B1' of the wind turbine. Lengths of wires 14 connecting the vertical rotating shaft B1' to the airfoils 13 are adjusted to control swing of the airfoils 13. When the wind is strong, the airfoils 13 are located in the first position as shown in FIG. 7(a) to be protected from damage. When wind is moderate, the airfoils 13 are located in a first stage second position as shown in FIG. 7(b) to generate electric power. When maintenance work on the vertical-axis wind turbine B1 is carried out, the airfoils 13 are swung by 90 degrees so as to be located in a second stage second position as shown in FIG. 7(c) where the airfoils 13 are close to the water surface, thereby making the maintenance work easy.

In the lift-type vertical-axis wind turbine B1, wherein the airfoils 13 can swing, the vertical rotating shaft B1' can be connected to each airfoil 13 by a linkage 16 provided with three or more pivot joints 15. With this structure, not only can the base portions of the airfoils 13 transmit the rotational torque generated by the wind turbine to the first float 1 but the middle portions of the airfoils 13 can also transmit the rotational torque generated by the wind turbine to the first float 1 through the linkages 16 and the vertical rotating shaft B1'. As a result, durability of the airfoils 13 is enhanced.

In the water current power generator E of FIG. 2(b), it is possible, as shown in FIG. 3(b), to provide ballast water storage spaces in the first float 1 and hydrofoils 17 of the vertical-axis water turbine D and fill the ballast water storage spaces with ballast water during power generation, thereby making the vertical-axis water turbine D extend upright. With this structure, it becomes possible, during maintenance work on the vertical-axis water turbine D, to discharge ballast water from the first float 1 and the hydrofoils 17, thereby raising and tipping the hydrofoils 17, or, when a weight 6 is suspended from the vertical-axis water turbine D, to let out the suspension rope to seat the weight 6 on the bottom of the body of water, and discharge ballast water from the first float 1 and the hydrofoils 17, thereby raising and tipping the hydrofoils 17 as shown in FIG. 3(d). Thus, the vertical-axis water turbine D comes close to the water surface, and maintenance work becomes easy.

In the water current power generator E of FIG. 2(b), similarly to FIGS. 4(a) and 4(b), the first float 1 can be provided with brakes accommodated in the first float 1 and capable of radially projecting from and retracting into a circumferential side surface of the first float 1, or brakes attached to a circumferential side surface of the first float 1 and capable of swinging between a closed position wherein the brakes extend along the circumferential side surface of the first float 1 and an open position wherein the brakes radially project from the circumferential side surface of the first float 1. When the first float 1 is provided with brakes, it becomes possible to urgently stop the rotating first float 1 when an accident occurs.

A water current power generator can comprise a pair of first floats 1, a pair of vertical-axis water turbines D, each of which is fixed to one of the pair of first floats 1 and extends downward, a second float 2 surrounding the first floats 1, a pair of sets of rollers 4, each of which comprises three rollers 4 attached to the second float 2 to abut on one of the first floats 1, and generators 5, each of which is mounted on one of the rollers 4. The second float 2 is moored by multi-point mooring with an intermediate buoy. In the same manner as shown in FIG. 5(b), a pair of mooring cables 11 connecting the second float 2 to an intermediate buoy 10 are arranged, as seen from above, line-symmetrically in relation to a second straight line Y' that crosses at right angles a first straight line X' extending between rotation axes of the pair of first floats 1 at a mid-position of the first straight line X' between the pair of first floats 1.

When mooring cables 11 connecting the second float 2 to the intermediate buoy 10 are arranged, as seen from above, line-symmetrically in relation to a second straight line Y' that crosses at right angles a first straight line X' extending between rotation axes of the pair of first floats 1 at a mid-position of the first straight line X' between the pair of first floats 1, the second float 2 is positioned leeward of the intermediate buoy 10 during the operation of the water current power generator E, the first straight line X' connecting the rotation axes of the pair of first floats 1 to each other is directed to the water current in face to face opposition, i.e., the water current flows at right angles to the first straight line X', and the pair of vertical-axis water turbines D rotate in opposite directions. As a result, the rotational torque transmitted from one of the pair of first floats 1 to the second float 2 and the rotational torque transmitted from the other of the pair of first floats 1 to the second float 2 cancel each other, and rotation of the second float 2 is prevented. Further, transverse forces impressed on the pair of vertical-axis water turbines D caused by Magnus effect cancel each other. As a result, mooring becomes easy and mooring cost decreases.

When a water current power generator comprising a single vertical-axis water turbine D, single first float 1 and a second float 2 is moored, it is desirable, in the same manner as shown in FIG. 5(d), to fix a radially extending arm member 12 to the second float 2, and extend a mooring cable 11 from the arm member 12 to an intermediate buoy 10, thereby mooring the second float 2 by single point mooring with an intermediate buoy. The arm member 12 lengthens the rotational lever of the second float 2 to decrease tensile force generated in the mooring cable 11 so as to cancel rotational torque transmitted from the first float 1 to the second float 2.

In the water current power generator E of FIG. 2(b), it is possible, in the same manner as shown in FIG. 6(a), to make the vertical-axis water turbine D a lift-type vertical-axis water turbine, wherein a plurality of vertically extending hydrofoils of large length circumferentially distanced from each other are disposed to form turbine blades, and further make the lift-type vertical-axis water turbine a helical water turbine by twisting the hydrofoils around the vertical rotating shaft of the water turbine, while maintaining the circumferential relative positions among the hydrofoils. When the plurality of vertically extending hydrofoils are twisted around the vertical rotating shaft of the water turbine, while maintaining circumferential relative positions among the hydrofoils, each hydrofoil extends, as seen from above, from the base portion to the tip portion in the circumferential direction around the vertical rotating shaft of the water turbine in the same manner as shown in FIG. 6(b). Thus, fluctuation of torque during rotation of the vertical-axis water turbine decreases. Further, a part of at least one of the plurality of hydrofoils is located in a water current moving from the trailing edge to the leading edge of the airfoil at the start of the vertical-axis water turbine in the same manner as shown in FIG. 6(c). Thus, vortices are generated near the leading edge to generate negative pressure, thereby generating starting torque. As a result, the vertical-axis water turbine starts easily.

In the wind power generators shown in FIGS. 3(a), 4(a), 5(a), 5(c) and 6(a), the vertical-axis wind turbines B, B1 are provided with arms 18 radially extending from the vertical rotating shafts B', B1' of the vertical-axis wind turbines to connect with the airfoils 13, thereby supporting the airfoils 13. Each arm 18 is desirably provided with a cover of airfoil-shaped cross section in order to decrease air resistance of the arm 18.

Figure 8:
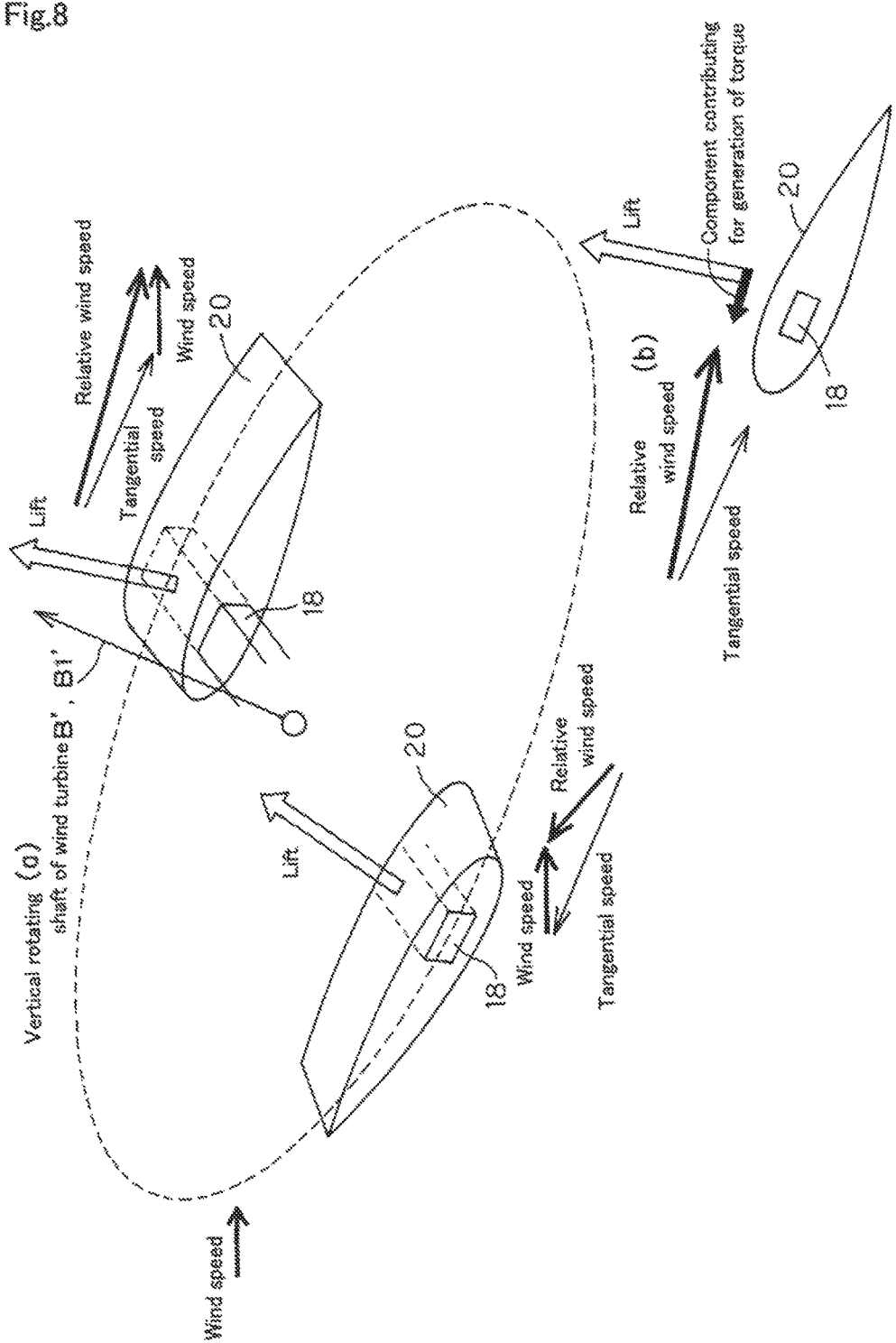
FIG. 8 is a set of partial structural views of an arm provided on a wind power generator, which is an application of a natural energy extraction apparatus in accordance with a preferred embodiment of the present invention, and partial structural views of a cover of airfoil-shaped cross section attached to the arm. (a) is a perspective view, and (b) is a sectional view.

In the offshore wind natural energy extraction apparatus of Patent Document No. 1, the vertical rotating shaft extends nearly vertically. Therefore, airfoils formed by the covers attached to the arms for connecting the vertical rotating shaft to the turbine blades do not have attack angles against relative air current and do not generate lifts. On the other hand, in the wind power generators shown in FIGS. 3(a), 4(a), 5(a), 5(c) and 6(a), the vertical-axis wind turbines B, B1 incline toward downstream of the air current as can be seen from FIG. 3(a), and airfoils formed by the covers 20 have attack angles against relative air current as shown in FIG. 8(a), to generate lifts and also induced drags at tips of the airfoils. Therefore, influence of lift and induced drag impressed on torque generated by the vertical-axis wind turbines B, B1 should be considered.

As shown in FIG. 8(b), the lift inclines toward the leading edge of the cover 20. Therefore, the lift contributes torque generation by the vertical-axis wind turbines B, B1. When the aspect ratio of the cover 20 is large, induced drag is small and lift-drag ratio is large. Therefore, the cover 20 of large aspect ratio fixed to the arm 18 contributes torque generation by the vertical-axis wind turbines B, B1.

Figure 9:
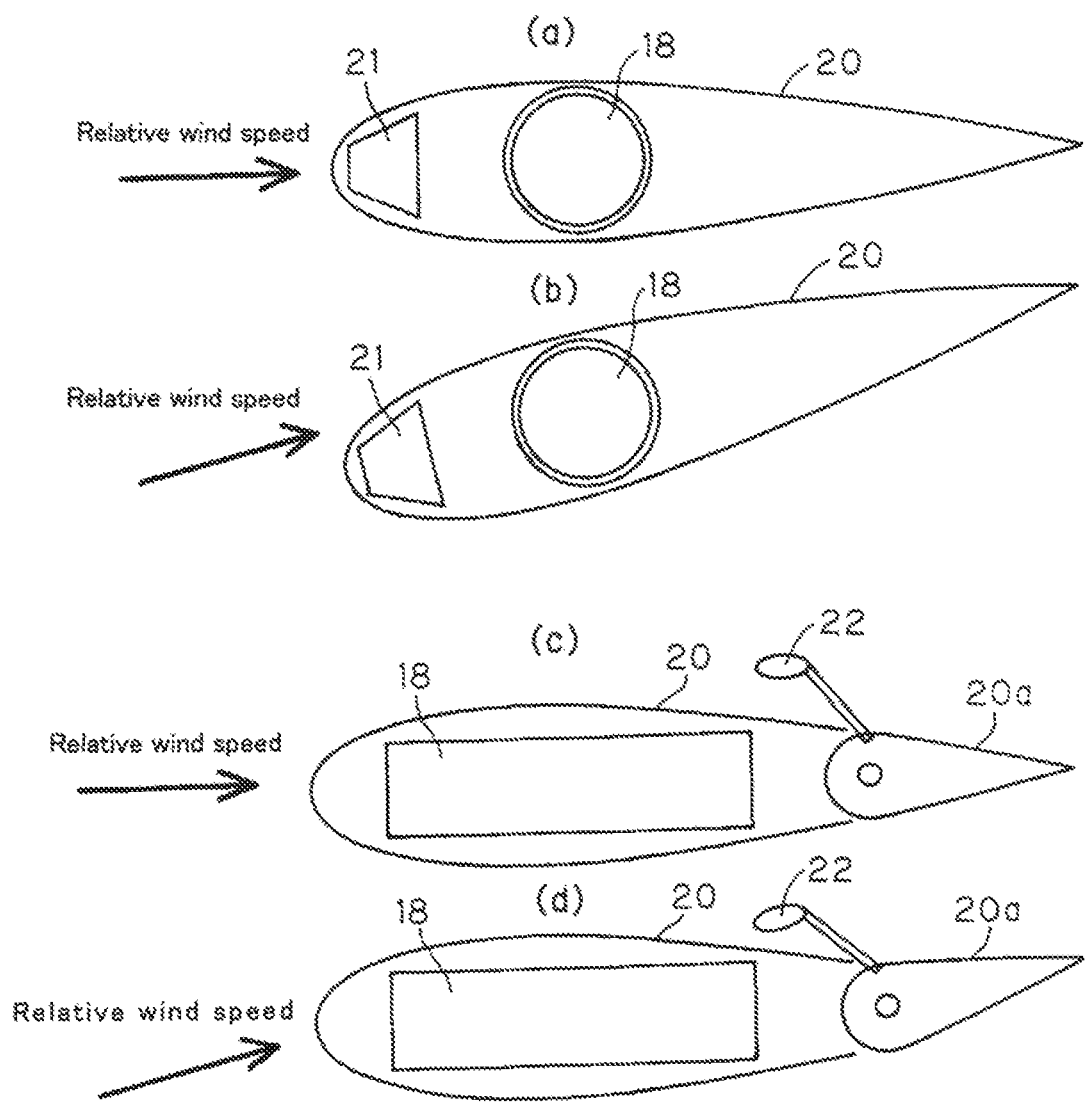
FIG. 9 is a set of sectional views of an arm provided on a wind power generator, which is an application of a natural energy extraction apparatus in accordance with a preferred embodiment of the present invention, and sectional views of a cover of airfoil-shaped cross section attached to the arm.

When the aspect ratio of the cover 20 is small, induced drag is large and lift-drag ratio is small. Thus, the cover 20 becomes a hindrance to torque generation by the vertical-axis wind turbines B, B1. Therefore, as shown in FIGS. 9(a) and 9(b), the cover 20 of small aspect ratio is desirably attached to the arm 18 rotatably around the longitudinal axis of the arm 18 so as not to have an attack angle against the relative air current, thereby restricting generation of lift and induced drag by the cover 20. The cover 20 should be provided with a balance weight 21 inside of or outside of the leading edge portion.

When the aspect ratio of the cover 20 is small, as shown in FIGS. 9(c) and 9(d), the trailing edge portion 20a of the cover 20, which is fixed to the arm 18 at longitudinal middle of its chord length, can be made rotatable around an axis extending parallel to the longitudinal axis of the arm 18 so as to make the trailing edge portion 20a have no attack angle against the relative air current, thereby restricting generation of lift and induced drag by the trailing edge portion 20a and decreasing induced drag generated by the cover 20. The trailing edge portion 20a should be provided with a balance weight 22 at the leading edge portion.

Also in the water current power generator of FIG. 3(b), arms 19 radially extending from the vertical rotating shaft D' to connect with the hydrofoils 17 of large length forming blades of the vertical-axis water turbine D and thereby supporting the hydrofoils 17, are desirably provided with covers of hydrofoil-shaped cross section so as to decrease hydraulic resistance.

As can be seen from FIG. 3(b), the vertical-axis water turbine D inclines toward downstream of the water current during operation of the water current power generator. Therefore, in the same manner as in the aforementioned wind power generator, covers fixed to the arms 19 can be provided with large aspect ratio to make lifts generated by the covers contribute to torque generation by the vertical-axis water turbine. When the aspect ratio of the covers is small, the covers can be attached to the arms 19 rotatably around longitudinal axes of the arms 19 so as to restrict generation of lifts and induced drags by the covers, or trailing edge portions of the covers fixed to the arms 19 can be made rotatable around axes extending parallel to the longitudinal axes of the arms 19 so as to restrict generation of lifts and induced drags by the trailing edge portions of the covers and finally restrict induced drags by the covers. In these cases, leading edge portions of the covers should be provided with balance weights like the balance weights 21, and leading edge portions of the trailing edge portions of the covers should be provided with balance weights like the balance weights 22.

The energy storage apparatus F of FIG. 2(c) can comprise, in the same manner as shown in FIG. 5(b), a pair of first floats 1, a second float 2 surrounding the pair of first floats 1, a pair of sets of rollers 4, each of which comprises three rollers 4 attached to the second float 2 to abut on one of the first floats 1, and generators 5, each of which is mounted on one of the rollers 4, and the second float 2 can be moored by multi-point mooring with an intermediate buoy. A pair of mooring cables 11 connecting the second float 2 to the intermediate buoy 10 are arranged, as seen from above, line-symmetrically in relation to a second straight line Y' that crosses at right angles a first straight line X' extending between rotation axes of the pair of first floats 1 at a mid-position of the first straight line X' between the pair of first floats 1.

When the pair of first floats 1 are rotated in opposite directions during the operation of the energy storage apparatus F, rotational torques transmitted from motors or generators to the second float 2 cancel each other, and rotation of the second float 2 is prevented. As a result, mooring becomes easy and mooring cost decreases.

Vertical-axis wind turbines and vertical-axis water turbines used in the present invention are not restricted to those of a particular type. Various type turbines can be used such as Darrieus type turbines, Giromill type turbines, Savonius type turbines, and Cross-flow type turbines, and so forth.

INDUSTRIAL APPLICABILITY

The present invention can be widely used for power generators, energy storage apparatuses, driving apparatuses for driven devices, etc. which are installed on a body of water.

BRIEF DESCRIPTION OF THE REFERENCE NUMERALS

A Natural energy extraction apparatus
B, B1 Vertical-axis wind turbine

B', B1' Vertical rotating shaft
C Wind power generator
D Vertical-axis water turbine
D' Vertical rotating shaft
E Water current power generator
F Energy storage apparatus
X Central axis
Y, Z Axis
X' First straight line
Y' Second straight line
1 First float
2 Second float
2a Float
2b Arm member
3 Support arm
4 Roller
5 Generator
6 Weight
7 Lightning arrester
8, 9 Brake
10 Intermediate buoy
11 Mooring cable
12 Arm member
13, 17 Airfoil, Hydrofoil
14 Wire
15 Pivot joint
16 Linkage
18, 19 Arm
20 Cover
20a Trailing edge portion
21, 22 Balance weight

The invention claimed is:

1. A natural energy extraction apparatus comprising: a first float forming a swingable vertical rotating shaft, a second float moored to surround the first float, and a power transmission device attached to the second float to convert rotational kinetic energy of the first float to driving torque for driven equipment, wherein the natural energy extraction apparatus is installed on a body of water,
wherein the power transmission device comprises a plurality of sets of toroidal rollers, disposed to retain contact with the swingable cylindrical rotating shaft as the rotating shaft swings, and a support member supporting each set of rollers and circumferentially distanced from one another, and
wherein each roller contacts the circumferential side surface of the first float at circumferential side surface and the support member is attached to the second float so as to support each roller rotatably around three axes orthogonally intersecting to one another and resiliently force the roller on the circumferential side surface of the first float.

2. A wind power generator comprising the natural energy extraction apparatus of claim 1 and a vertical-axis wind turbine fixed to the first float to extend upward, wherein the driven equipment is a power generator.

3. A wind power generator of claim 2, comprising a plurality of power transmission devices and power generators.

4. A wind power generator of claim 2, further comprising a weight fixed to or suspended from a lower end of the first float.

5. A wind power generator of claim 2, further comprising a lightning arrester attached to the vertical-axis wind turbine.

6. A wind power generator of claim 2, further comprising a brake accommodated in the first float and capable of radially projecting from and retracting into a circumferential side surface of the first float, or a brake attached to a circumferential side surface of the first float and capable of swinging between a closed position wherein the brake extends along the circumferential side surface of the first float and an open position wherein the brake radially projects from the circumferential side surface of the first float.

7. A wind power generator of claim 2, wherein the first float comprises a ballast water storage space, and wherein the ballast water storage space is filled with ballast water during power generation.

8. A wind power generator of claim 2, comprising a pair of first floats, a pair of vertical-axis wind turbines each fixed to one of the pair of first floats and extending upward, a second float moored to surround the pair of first floats, and power transmission devices attached to the second float to convert rotational kinetic energies of the first floats to driving torque for driven equipment, wherein the second float is moored by multi-point mooring with an intermediate buoy, and mooring cables connecting the second float to the intermediate buoy are arranged, as seen from above, line-symmetrically in relation to a second straight line that crosses at right angles a first straight line extending between rotation axes of the pair of first floats at a mid-position of the first straight line between the pair of first floats.

9. A wind power generator of claim 2, wherein the vertical-axis wind turbine is a lift-type vertical-axis wind turbine provided with a plurality of vertically extending airfoils forming turbine blades circumferentially distanced from each other, and the airfoils are twisted around a vertical rotating shaft of the wind turbine, while maintaining circumferential relative positions among them.

10. A wind power generator of claim 2, wherein the vertical-axis wind turbine is a lift-type vertical-axis wind turbine provided with a plurality of vertically extending airfoils forming turbine blades circumferentially distanced from each other, and each airfoil can swing between a first position wherein an upper end thereof is close to a vertical rotating shaft of the wind turbine and a second position wherein the upper end thereof is distanced from the vertical rotating shaft of the wind turbine.

11. A wind power generator of claim 2, wherein the vertical-axis wind turbine is provided with arms radially extending from a vertical rotating shaft of the wind turbine to connect with turbine blades, thereby supporting the turbine blades, and a cover of airfoil-shaped cross section is fixed to each arm.

12. A wind power generator of claim 2, wherein the vertical-axis wind turbine is provided with arms radially extending from a vertical rotating shaft to connect with turbine blades, thereby supporting the turbine blades, a cover of airfoil-shaped cross section is attached to each arm, and the cover is as a whole body enabled to rotate around a longitudinal axis of the arm or a trailing edge portion of the cover can rotate around an axis parallel to the longitudinal axis of the arm.

13. A water current power generator comprising the natural energy extraction apparatus of claim 1 and a vertical-axis water turbine fixed to the first float to extend downward, wherein the driven equipment is a power generator.

14. A water current power generator of claim 13, comprising a plurality of power transmission devices and power generators.

15. A water current power generator of claim 13, further comprising a weight fixed to or suspended from a lower end of a vertical rotating shaft of the vertical-axis water turbine.

16. A water current power generator of claim 13, further comprising a brake accommodated in the first float and capable of radially projecting from and retracting into a circumferential side surface of the first float, or a brake attached to a circumferential side surface of the first float and capable of swinging between a closed position wherein the brake extends along the circumferential side surface of the first float and an open position wherein the brake radially projects from the circumferential side surface of the first float.

17. A water current power generator of claim 13, wherein the first float and the vertical-axis water turbine comprise ballast water storage spaces, and wherein the ballast water storage spaces are filled with ballast water during power generation.

18. A water current power generator of claim 13, comprising a pair of first floats, a pair of vertical-axis water turbines each fixed to one of the pair of first floats and extending downward, a second float moored to surround the pair of first floats, and power transmission devices attached to the second float to convert rotational kinetic energies of the first floats to driving torque for driven equipment, wherein the second float is moored by multi-point mooring with an intermediate buoy, and mooring cables connecting the second float to the intermediate buoy are arranged, as seen from above, line-symmetrically in relation to a second straight line that crosses at right angles a first straight line extending between rotation axes of the pair of first floats at a mid-position of the first straight line between the pair of first floats.

19. A water current power generator of any claim 13, wherein the vertical-axis water turbine is a lift-type vertical-axis water turbine provided with a plurality of vertically extending hydrofoils forming turbine blades circumferentially distanced from each other, and the hydrofoils are twisted around a vertical rotating shaft of the water turbine, while maintaining circumferential relative positions among them.

20. A water current power generator of claim 13, wherein the vertical-axis water turbine is provided with arms radially extending from a vertical rotating shaft of the water turbine to connect with turbine blades, thereby supporting the turbine blades, and a cover of hydrofoil-shaped cross section is fixed to each arm.

21. A water current power generator of claim 13, wherein the vertical-axis water turbine is provided with arms radially extending from a vertical rotating shaft to connect with turbine blades, thereby supporting the turbine blades, a cover of hydrofoil-shaped cross section is attached to each arm, and the cover is as a whole body enabled to rotate around a longitudinal axis of the arm or a trailing edge portion of the cover can rotate around an axis parallel to the longitudinal axis of the arm.

22. An energy storage apparatus comprising the natural energy extraction apparatus of claim 1, wherein the driven equipment is a power generator, and wherein electric power is supplied to the power generator to be converted to rotational kinetic energy of the first float, and the rotational kinetic energy is stored in the first float.

23. An energy storage apparatus of claim 22, comprising a pair of first floats and a second float moored to surround the pair of first floats, wherein the second float is moored by multi-point mooring with an intermediate buoy, and mooring cables connecting the second float to the intermediate buoy are arranged, as seen from above, line-symmetrically in relation to a second straight line that crosses at right angles a first straight line extending between rotation axes of the pair of first floats at a mid-position of the first straight line between the pair of first floats.

* * * * *